(12) United States Patent
Liu et al.

(10) Patent No.: US 11,837,965 B2
(45) Date of Patent: Dec. 5, 2023

(54) HIGH-VOLTAGE DEVICE

(71) Applicant: SHANGHAI UNITED IMAGING HEALTHCARE CO., LTD., Shanghai (CN)

(72) Inventors: Yufeng Liu, Shanghai (CN); Guoping Zhu, Shanghai (CN)

(73) Assignee: SHANGHAI UNITED IMAGING HEALTHCARE CO., LTD., Shanghai (CN)

( * ) Notice: Subject to any disclaimer, the term of this patent is extended or adjusted under 35 U.S.C. 154(b) by 240 days.

(21) Appl. No.: 17/449,238

(22) Filed: Sep. 28, 2021

(65) Prior Publication Data
US 2022/0103087 A1 Mar. 31, 2022

(30) Foreign Application Priority Data

Sep. 28, 2020 (CN) .......................... 202011040181.2
Sep. 28, 2020 (CN) .......................... 202022168227.0

(51) Int. Cl.
*H02M 7/02* (2006.01)
*H02M 7/00* (2006.01)
*H02M 1/44* (2007.01)
*H02M 7/06* (2006.01)

(52) U.S. Cl.
CPC ............. *H02M 7/003* (2013.01); *H02M 1/44* (2013.01); *H02M 7/06* (2013.01)

(58) Field of Classification Search
CPC .......... H02M 7/003; H02M 7/06; H02M 1/44; H05G 1/08; H05G 1/085; H05G 1/10; H05G 1/12
See application file for complete search history.

(56) References Cited

U.S. PATENT DOCUMENTS

| 3,123,760 | A | | 3/1964 | Shield | |
|---|---|---|---|---|---|
| 3,128,421 | A | * | 4/1964 | Skellett | H02M 7/106 |
| | | | | | 363/68 |
| 3,239,751 | A | * | 3/1966 | Sibary | G01R 1/203 |
| | | | | | 338/277 |

(Continued)

FOREIGN PATENT DOCUMENTS

DE 102014006050 A1 12/2015

OTHER PUBLICATIONS

The Extended European Search Report in European Application No. 21199632.7 dated Feb. 15, 2022, 12 pages.

*Primary Examiner* — Gary L Laxton
(74) *Attorney, Agent, or Firm* — METIS IP LLC

(57) ABSTRACT

A high-voltage generator may be provided. The high-voltage generator may include a rectifying unit, a grid-controlled unit, and a shielding device. The rectifying unit may be configured to rectify an electric current generated in the high-voltage generator. The grid-controlled unit may be configured to generate a high voltage and electrically connected to the rectifying unit. The grid-controlled unit may have a conductive surface that opposes the rectifying unit. The shielding device may be located between the rectifying unit and the conductive surface of the grid-controlled unit. The shielding device may be spaced apart from the rectifying unit and the conductive surface of the grid-controlled unit. The shielding device may be electrically connected to the rectifying unit.

20 Claims, 11 Drawing Sheets

(56) References Cited

U.S. PATENT DOCUMENTS

| | | | | |
|---|---|---|---|---|
| 3,601,656 A | * | 8/1971 | Smith | H02M 7/062 |
| | | | | 174/397 |
| 2009/0039710 A1 | | 2/2009 | Beyerlein et al. | |
| 2022/0319795 A1 | * | 10/2022 | Kadoi | H01J 37/248 |

* cited by examiner

HIGH-VOLTAGE DEVICE

CROSS-REFERENCE TO RELATED APPLICATIONS

This application claims priority to Chinese Patent Application Nos. 2020110401812 and 2020221682270, both filed on Sep. 28, 2020, the contents of each of which are hereby incorporated by reference.

TECHNICAL FIELD

The disclosure generally relates to electrical apparatus, and more particularly, relates to high-voltage generators.

BACKGROUND

Stray capacitance usually exists between two conductive components of an electrical apparatus (e.g., a conductive housing of a grid-controlled unit and a rectifying unit of a high-voltage generator). If a voltage between the two conductive components is relatively high, the stray capacitance may damage electrical elements (e.g., diodes) in the two conductive components. Conventionally, a distance between the two components may be increased so as to reduce the stray capacitance. However, the increase of the distance results in an increase in the volume of the electrical apparatus. Thus, it is desirable to develop an electrical apparatus that operates normally and stably within a wide range of voltages.

SUMMARY

According to an aspect of the present disclosure, a high-voltage generator may be provided. The high-voltage generator may include a rectifying unit, a grid-controlled unit, and a shielding device. The rectifying unit may be configured to rectify an electric current generated in the high-voltage generator. The grid-controlled unit may be configured to generate a high voltage and electrically connected to the rectifying unit. The grid-controlled unit may have a conductive surface that opposes the rectifying unit. The shielding device may be located between the rectifying unit and the conductive surface of the grid-controlled unit. The shielding device may be spaced apart from the rectifying unit and the conductive surface of the grid-controlled unit. The shielding device may be electrically connected to the rectifying unit.

In some embodiments, a projection of the shielding device along a first direction may cover at least a portion of the rectifying unit.

In some embodiments, the rectifying unit may include an array of diodes.

In some embodiments, stray capacitance may exist between the conductive surface of the grid-controlled unit and the rectifying unit.

In some embodiments, the shielding device may include a shielding plate facing the rectifying unit. A projection of the shielding plate along a first direction may cover at least a portion of the rectifying unit.

In some embodiments, the shielding plate may include a metal plate.

In some embodiments, the shielding device may include at least one voltage-multiplying capacitor. A projection of the at least one voltage-multiplying capacitor along the first direction may cover at least a portion of the rectifying unit.

In some embodiments, the high-voltage generator may further include a rectifying plate. The rectifying unit may be disposed on the rectifying plate.

In some embodiments, the high-voltage generator may further include a suppressing unit electrically connected between the rectifying unit and the grid-controlled unit. The suppressing unit may be configured to suppress an amplitude of the electric current from the rectifying unit to a load device.

According to another aspect of the present disclosure, a high-voltage generator may be provided. The high-voltage generator may include a rectifying unit and a grid-controlled unit. The rectifying unit may be configured to rectify an electric current generated in the high-voltage generator. The rectifying unit may be substantially disposed in a first plane. The grid-controlled unit may be configured to generate a high voltage and electrically connected to the rectifying unit. The grid-controlled unit may have a conductive surface. The conductive surface may be arranged facing the rectifying unit. An angle between the first plane and the conductive surface may be larger than 0 degrees and smaller than 180 degrees.

In some embodiments, the angle between the first plane and the conductive surface may equal 90 degrees.

In some embodiments, the high-voltage generator may further include a shielding device located between the rectifying unit and the grid-controlled unit. The shielding device may be spaced apart from the rectifying unit and the grid-controlled unit. The shielding device may be electrically connected to the rectifying unit. A projection of the shielding device along a first direction may cover at least a portion of the rectifying unit.

According to yet another aspect of the present disclosure, a device may be provided. The device may include a first conductive component and a second conductive component. The second conductive component may oppose the first conductive component and be electrically connected to the first conductive component. The first conductive component may have a higher electric potential than the second conductive component. A projection area of the first conductive component onto the second conductive component may be smaller than an original projection area of the first conductive component onto the second conductive component.

In some embodiments, the device may further include a shielding device located between the first conductive component and the second conductive component. The shielding device may be spaced apart from the first conductive component and the second conductive component. The shielding device may be electrically connected to the first conductive component. A projection of the shielding device along a first direction may cover at least a portion of the first conductive component so that the projection area of the first conductive component onto the second conductive component is smaller than the original projection area of the first conductive component onto the second conductive component.

In some embodiments, the projection of the shielding device along the first direction may cover the first conductive component.

In some embodiments, the shielding device may include a metal plate facing the first conductive component.

In some embodiments, the first conductive component may be located on a first plane. The second conductive component may be located on a second plane. An angle between the first plane and the second plane may be larger than 0 degrees and smaller than 180 degrees so that the projection area of the first conductive component onto the second conductive component is smaller than the original projection area of the first conductive component onto the second conductive component.

In some embodiments, the angle between the first plane and the second plane may equal 90 degrees.

In some embodiments, the first conductive component may include an array of diodes, and the second conductive component may include a grid-controlled power source.

In some embodiments, the device may further include a suppressing unit electrically connected between the array of diodes and the grid-controlled power source. The suppressing unit may be configured to suppress an amplitude of an electric current from the array of diodes to a load device.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. The drawings are not to scale. These embodiments are non-limiting exemplary embodiments, in which like reference numerals represent similar structures throughout the several views of the drawings, and wherein.

DETAILED DESCRIPTION

Figure 1:
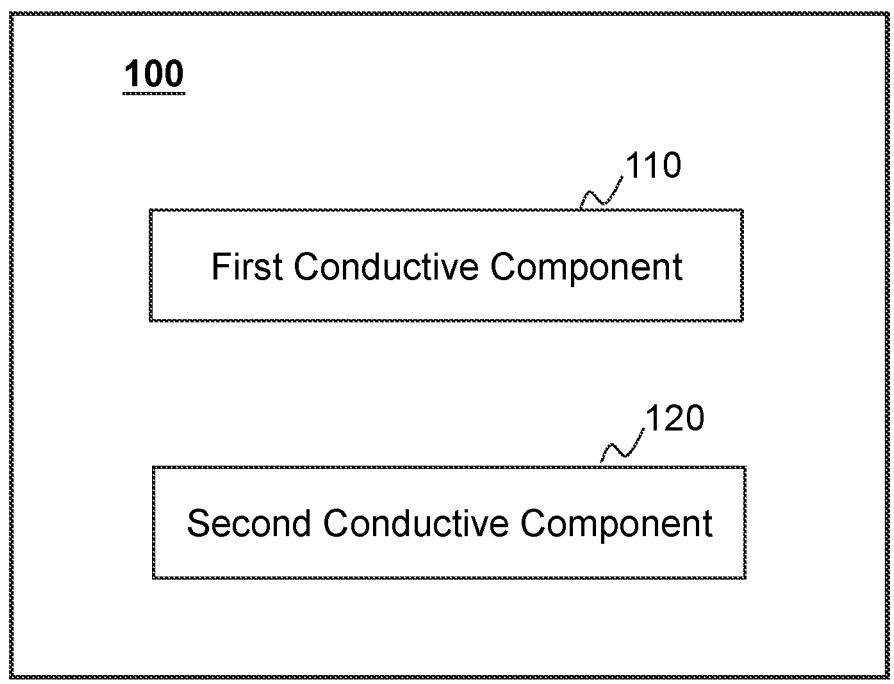
FIG. 1 is a block diagram illustrating an exemplary electrical apparatus 100 according to some embodiments of the present disclosure.

The following description is presented to enable any person skilled in the art to make and use the present disclosure and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown but is to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including" when used in this disclosure, specify the presence of stated features, integers, steps, operations, elements, and/or components, but do not preclude the presence or addition of one or more other features, integers, steps, operations, elements, components, and/or groups thereof.

Generally, the word "module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or another storage device. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in firmware, such as an erasable programmable read-only memory (EPROM). It will be further appreciated that hardware modules/units/blocks may be included in connected logic components, such as gates and flip-flops, and/or can be included of programmable units, such as programmable gate arrays or processors. The modules/units/blocks or computing device functionality described herein may be implemented as software modules/units/blocks but may be represented in hardware or firmware. In general, the modules/units/blocks described herein refer to logical modules/units/blocks that may be combined with other modules/units/blocks or divided into sub-modules/sub-units/sub-blocks despite their physical organization or storage. The description may be applicable to a system, an engine, or a portion thereof.

It will be understood that the term "system," "engine," "unit," "module," and/or "block" used herein are one method to distinguish different components, elements, parts, sections or assembly of different levels in ascending order. However, the terms may be displaced by another expression if they achieve the same purpose.

It will be understood that when a unit, engine, module or block is referred to as being "on," "connected to," or "coupled to," another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

An aspect of the present disclosure relates to a high-voltage generator. The high-voltage generator may include a rectifying unit, a grid-controlled unit, and a shielding device. The rectifying unit may be configured to rectify an electric current generated in the high-voltage generator. The grid-controlled unit may be configured to generate a high voltage and electrically connected to the rectifying unit. The grid-controlled unit may have a conductive surface that opposes the rectifying unit. In some embodiments, an electric potential of the conductive surface of the grid-controlled unit may have a same polarity as an electric potential of the rectifying unit. For example, both the conductive surface and the rectifying unit may have a positive electric potential. Alternatively, the electric potential of the conductive surface of the grid-controlled unit may have an opposite polarity to the electric potential of the rectifying unit. For example, the conductive surface of the grid-controlled unit may have a positive electric potential, and the rectifying unit may have a negative electric potential. The shielding device may be located between the rectifying unit and the conductive surface of the grid-controlled unit. The shielding device may be spaced apart from the rectifying unit and the conductive surface of the grid-controlled unit.

Another aspect of the present disclosure relates to a high-voltage generator. The high-voltage generator may include a rectifying unit and a grid-controlled unit. The rectifying unit may be configured to rectify an electric current generated in the high-voltage generator. The rectifying unit may be substantially disposed in a first plane. The grid-controlled unit may be configured to generate a high voltage and electrically connected to the rectifying unit. The grid-controlled unit may have a conductive surface. The conductive surface may be arranged facing the rectifying unit. An angle between the first plane and the conductive surface may be larger than 0 degrees and smaller than 180 degrees.

Conventionally, stray capacitance between a grid-controlled unit and a rectifying unit in a high-voltage generator may be reduced by measures including, e.g., setting the grid-controlled unit farther apart from the rectifying unit (that is by increasing a distance between the grid-controlled unit and the rectifying unit), or disposing the grid-controlled unit and the rectifying unit in different containers, respectively. Such measures may increase a volume of the high-voltage generator. According to some embodiments of the present disclosure, the stray capacitance between the grid-controlled unit and the rectifying unit may be reduced by arranging the shielding device between the rectifying unit and the grid-controlled unit, which may reduce or avoid the impact of the saltation of the electric potential of the conductive housing of the grid-controlled unit on the rectifying unit, thereby facilitating a normal and stable operation of the high-voltage generator. In some embodiments, the shielding device may be implemented as the shielding plate. Alternatively, the shielding device may also be a conductive component of the high-voltage generator. In this case, the addition of the shielding device in the high-voltage generator may cause no or little increase in the volume of the high-voltage generator, thereby saving costs of the high-voltage generator and maintaining the compactness of the high-voltage generator.

FIG. 1 is a block diagram illustrating an exemplary electrical apparatus 100 according to some embodiments of the present disclosure. In some embodiments, the electrical apparatus 100 may include a plurality of electrical components. Each of the plurality of electrical components may include at least one electrical element, such as a resistor, a power supply, a capacitor, a diode, an audion, a filter, a rectifier, a modulator, etc., or an electrical circuit including one or more electrical elements. In some embodiments, an electrical component may be a conductive component. As used herein, "conductive" means "electrically conductive," unless otherwise stated. The conductive component may further include one or more conductors. A conductor may be or include an electrical element (e.g., a resistor) and/or a conductive structure. The conductive structure may be, for example, a conductive wire (e.g., a copper wire, an aluminum wire, etc.), a conductive plate, a conductive bar, etc.

As shown in FIG. 1, the electrical apparatus 100 may include a first conductive component 110 and a second conductive component 120. In some embodiments, the first conductive component 110 and/or the second conductive component 120 may be or include at least one conductor. The at least one conductor may be, for example, a conductive wire, a conductive plate, a conductive bar, a resistor, etc. Merely by way of example, the first conductive component 110 may include a plurality of diodes and conductive wires (e.g., lead wires of the plurality of diodes and electric wires of an electrical circuit connecting the plurality of diodes). The second conductive component 120 may include a conductive plate.

The first conductive component 110 may have a first geometrical shape. The first geometrical shape may be a regular shape (e.g., a rectangular plate, a square plate, a round plate, a cuboid, a cylinder, etc.) or an irregular shape. One or more electrical elements and/or conductive structures of the first conductive component 110 may be arranged substantially in the first geometrical shape, thus forming the first geometrical shape of the first conductive component 110. For example, the first conductive component 110 may have a shape of a plate. The one or more electrical elements and/or conductive structures of the first conductive component 110 may be arranged substantially in the plate. As used herein, "substantially" A indicates that the deviation from A is below a threshold (e.g., 5%, 10%, 15%, 20%). For instance, an item (e.g., an electrical element, a conductive structure) being "substantially" in a shape (e.g., in a plate) indicates that a difference between a shape of the item and the shape is below the threshold.

Similarly, the second conductive component 120 may have a second geometrical shape. The second geometrical shape may be a regular shape (e.g., a rectangular plate, a square plate, a round plate, a cuboid, a cylinder, etc.) or an irregular shape. One or more electrical elements and/or conductive structures of the second conductive component 120 may be arranged substantially in the second geometrical shape, thus forming the second geometrical shape of the second conductive component 120. For example, the second conductive component 120 may have a conductive housing. The conductive housing may have a shape of a cuboid. The one or more electrical elements and/or conductive structures of the second conductive component 120 may be arranged substantially in the conductive housing. In the present disclosure, "electrical" and "electric" are used interchangeably.

In some embodiments, the first conductive component 110 may be spaced apart from the second conductive component 120. For example, a distance between the first conductive component 110 and the second conductive component 120 (e.g., between a center or a specific point of the first conductive component 110 and a center or a specific point of the second conductive component 120) may exceed a first threshold distance. The first threshold distance may be, for example, 1 millimeter, 2 millimeters, 5 millimeters, 1 centimeter, 2 centimeters, 5 centimeters, 10 centimeters, etc. In some embodiments, the second conductive component 120 may oppose the first conductive component 110. Merely by way of example, the first conductive component 110 and the second conductive component 120 may each have a shape of a plate. The two plates may oppose each other. For instance, the two plates may be arranged parallelly. A distance between the two plates may exceed the first threshold distance.

In some cases, an electric potential difference (i.e., voltage) may exist between the first conductive component 110 and the second conductive component 120. For instance, when the electrical apparatus 100 operates, an electric potential of the second conductive component 120 may have a saltation (e.g., in several nanoseconds (ns), tens of ns, etc.), causing a relatively large voltage between the first conductive component 110 and the second conductive component 120. In some embodiments, the first conductive component 110 may have a higher electric potential than the second conductive component 120. Alternatively, the first conductive component 110 may have a lower electric potential than the second conductive component 120. Since the first conductive component 110 is spaced apart from the second conductive component 120 and the voltage exists between the first conductive component 110 and the second conductive component 120, capacitance (e.g., stray capacitance) may exist between the first conductive component 110 and the second conductive component 120.

In some embodiments, if the stray capacitance between the first conductive component 110 and the second conductive component 120 is relatively high, when an electric potential difference between the first conductive component 110 and the second conductive component 120 is relatively high, and at the same time an abrupt change in the electric potential difference between the first conductive component 110 and the second conductive component 120 occurs, one or more electrical elements (e.g., diodes) of the first conductive component 110 and/or the second conductive component 120 may be damaged. In some embodiments, the stray capacitance between the first conductive component 110 and the second conductive component 120 may be relatively high due to, e.g., a relatively short distance between the first conductive component 110 and the second conductive component 120 and/or a relatively large projection area of the first conductive component 110 onto the second conductive component 120. In some embodiments, an abrupt change in the electric potential difference between the first conductive component 110 and the second conductive component 120 may occur when an electric potential of one of the first conductive component 110 and the second conductive component 120 has a saltation (e.g., at a rate of 70 kV/10 ns), and an electric potential of the other remains substantially unchanged. The stray capacitance between the first conductive component 110 and the second conductive component 120 may be reduced so as to prevent the one or more electrical elements of the first conductive component 110 and/or the second conductive component 120 from being damaged. The stray capacitance between the first conductive component 110 and the second conductive component 120 may relate to factors including, e.g., a distance between the first conductive component 110 and the second conductive component 120, a projection area (also referred to as projection region) of the first conductive component 110 onto the second conductive component 120 along a specific projection direction, etc.

Figure 2A:
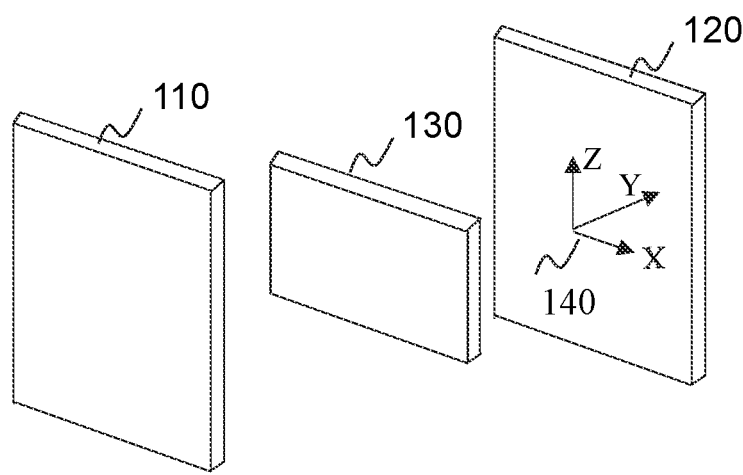
FIG. 2A is a schematic illustrating an exemplary electrical apparatus according to some embodiments of the present disclosure.
Figure 2B:
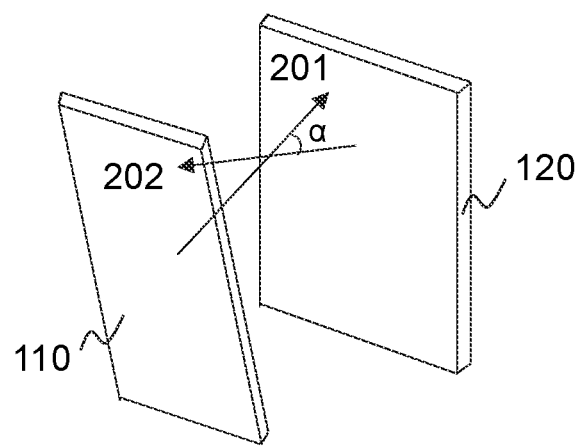
FIG. 2B is a schematic illustrating an angle between a first plane and a second plane according to some embodiments of the present disclosure.

The following descriptions of FIGS. 1 through 2B are provided, unless otherwise stated expressively, with reference to the case that the first conductive component 110 and the second conductive component 120 are the first plate and the second plate, respectively, for illustration purposes and not intended to be limiting.

In some embodiments, the electrical apparatus 100 may be configured such that a projection area of the first conductive component 110 onto the second conductive component 120 along a specific projection direction may be smaller than an original projection area of the first conductive component 110, thereby reducing the stray capacitance between first conductive component 110 and the second conductive component 120. As used herein, the projection area of a component A onto a component B refers to an area of the projection of the component A onto a plane where the component B is disposed along a specific direction; the specific projection direction may be a direction substantially perpendicular to the plane where the component B is disposed. For instance, the original projection area of the first conductive component 110 onto the second conductive component 120 refers to an original area of the projection of the first conductive component 110 onto the second conductive component 120 along the specific projection direction before any measures for reducing the stray capacitance are taken. As another example, the projection area of the first conductive component 110 onto the second conductive component 120 refers to an actual area of the projection of the first conductive component 110 onto the second conductive component 120 along the specific projection direction after one or more measures for reducing the stray capacitance are taken. The specific projection direction may be a direction substantially perpendicular to the plane where the second conductive component 120 is disposed. For example, referring to FIG. 2A, the second conductive component 120 may have a shape of a plate (e.g., a rectangular plate, a circular plate, etc.). The plane where the second conductive component 120 is disposed may be the XZ plane with reference to the coordinate system 140 as illustrated in FIG. 2A. As another example, the second conductive component 120 may have a shape of an irregular shape. The plane where the second conductive component 120 is disposed may be determined by performing a fitting operation. The fitting operation may be performed using, for example, MATLAB. The larger the projection area of the first conductive component 110 onto the second conductive component 120 along the specific projection direction is, the greater the stray capacitance may be. The projection area of the first conductive component 110 onto the second conductive component 120 along the specific projection direction may also be referred to as the projection area associated with the stray capacitance for brevity.

In some embodiments, as shown in FIG. 2A, the electrical apparatus 100 may be provided with a shielding device 130 configured to reduce the stray capacitance between the first conductive component 110 and the second conductive component 120. The shielding device 130 may be located between the first conductive component 110 and the second conductive component 120. A projection of the shielding device 130 along a first direction may cover (e.g., shield) at least a portion of the first conductive component 110 such that the projection area associated with the stray capacitance may be smaller than the original area of the first conductive component 110, thereby reducing the stray capacitance between the first conductive component 110 and the second conductive component 120. The first direction herein may be opposite to the specific projection direction in which the first conductive component 110 is projected onto the second conductive component 120.

In some embodiments, the projection of the shielding device 130 along the first direction may cover at least a portion of the first conductive component 110 such that the at least a portion of the first conductive component 110 that opposes the second conductive component 120 may now oppose the shielding device 130 but not the second conductive component 120 and therefore does not contribute to the formation of the stray capacitance. As used herein, component A, or a portion thereof, opposing component B, or a portion thereof, indicates that, between the component A, or the portion thereof, and the component B, or the portion thereof, there exists no structural element whose projection area onto the component B at least partially overlaps the projection of the component A onto the component B. After the shielding device 130 is placed between the first conductive component 110 and the second conductive component 120, the projection area associated with the stray capacitance may equal an original projection area of the other portion of the first conductive component 110 onto the second conductive component 120 along the specific projection direction, which is smaller than the original projection area of the first conductive component 110 onto the second conductive component 120 along the specific projection direction. In this way, the stray capacitance between the first conductive component 110 and the second conductive component 120 may be reduced.

In some embodiments, the projection of the shielding device 130 along the first direction may cover the entire first conductive component 110. After the shielding device 130 is placed between the first conductive component 110 and the second conductive component 120, the projection area associated with the stray capacitance may be equal to zero. In this way, the stray capacitance between the first conductive component 110 and the second conductive component 120 may be reduced.

In some embodiments, the shielding device 130 may be spaced apart from the first conductive component 110 and the second conductive component 120. For example, a distance between the first conductive component 110 and the shielding device 130 (e.g., between a center or a specific point of the first conductive component 110 and a center or a specific point of the shielding device 130 may exceed a second threshold distance. The second threshold distance may be, for example, 1 millimeter, 1.5 millimeter, 2 millimeters, 1 centimeter, 2 centimeters, 3 centimeters, 5 centimeters, etc. A distance between the shielding device 130 and the second conductive component 120 (e.g., between a center or a specific point of the shielding device 130 and a center or a specific point of the second conductive component 120 may exceed a third threshold distance. The third threshold distance may be, for example, 1 millimeter, 3 millimeter, 5 millimeters, 1 centimeter, 3 centimeters, 5 centimeters, etc.

The shielding device 130 may be a conductive device. In some embodiments, the shielding device 130 may be or include at least one conductor. The at least one conductor may be, for example, a conductive plate, a conductive bar, a resistor, a capacitor, etc. For example, the shielding device 130 may include a metal plate facing the first conductive component 110. As another example, the shielding device 130 may include one or more electric components of the electrical apparatus 100 facing the first conductive component 110. The one or more electric components may be conductive components.

In some embodiments, the shielding device 130 may be electrically connected (or referred to as connected for brevity) to the first conductive component 110. In some embodiments, the shielding device 130 may have a specific electric potential. The specific electric potential may be determined by a user (e.g., an engineer) according to an actual need.

In some embodiments, a plane where the first conductive component 110 is (substantially) disposed is referred to as a first plane. A plane where the second conductive component 120 is substantially disposed is referred to as a second plane. In some embodiments, an angle between the first plane and the second plane may be adjusted (e.g., from 0 degrees to an angle in a range of larger than 0 degrees and smaller than 180 degrees) so as to reduce the projection area associated with the stray capacitance, thereby reducing the stray capacitance between first conductive component 110 and the second conductive component 120.

In some embodiments, the angle between the first plane and the second plane may be represented by an angle between a normal vector of the first plane and a normal vector of the second plane. FIG. 2B is a schematic illustrating an angle between the first plane and the second plane according to some embodiments of the present disclosure. As shown in FIG. 2B, the first plane where the first conductive component 110 is disposed has a normal vector 201 and the second plane where the second conductive component 120 is disposed have a normal vector 202. The angle between the first plane and the second plane is angle a.

Merely by way of example, the angle a may be zero before the measures for reducing the stray capacitance are taken. In some embodiments, the adjusted angle may be larger than 30 degrees and smaller than 150 degrees. In some embodiments, the adjusted angle may be larger than 45 degrees and smaller than 135 degrees. In some embodiments, the adjusted angle may be larger than 60 degrees and smaller than 120 degrees. In some embodiments, the adjusted angle may equal 90 degrees, such that the projection area associated with the stray capacitance may be reduced to a minimum area.

Merely for illustration, the first conductive component 110 may be a first plate, and the second conductive component 120 may be a second plate. The first plate may oppose the second plate. An angle between the first plate and the second plate may substantially equal zero. The stray capacitance between the first conductive component 110 and the second conductive component 120 may relate to a distance between the first plate and the second plate, a projection area of the first plate onto the second plate along a specific projection direction (e.g., a direction perpendicular to the second plate), etc. The electrical apparatus 100 may be provided with the shielding device 130 located between the two plates and/or configured such that an angle between the two plates is larger than 0 degrees and smaller than 180 degrees, thereby reducing the projection area of the first plate onto the second plate along the specific projection direction. Thus, the stray capacitance between the first conductive component 110 and the second conductive component 120 may be reduced.

In some embodiments, the electrical apparatus 100 may be a high-voltage generator. The first conductive component 110 of the electrical apparatus 100 may include a rectifying unit including an array of diodes, and the second conductive component 120 of the electrical apparatus 100 may include a conductive surface of a grid-controlled unit including grid-controlled power source. In some embodiments, the electrical apparatus 100 may further include a suppressing unit electrically connected between the array of diodes and the grid-controlled power source. The suppressing unit may be configured to suppress an amplitude of an electric current from the array of diodes to a load device. More descriptions regarding the high-voltage generator may be found elsewhere in the present disclosure. See, e.g., FIGS. 3-7 and the descriptions thereof.

Figure 3:
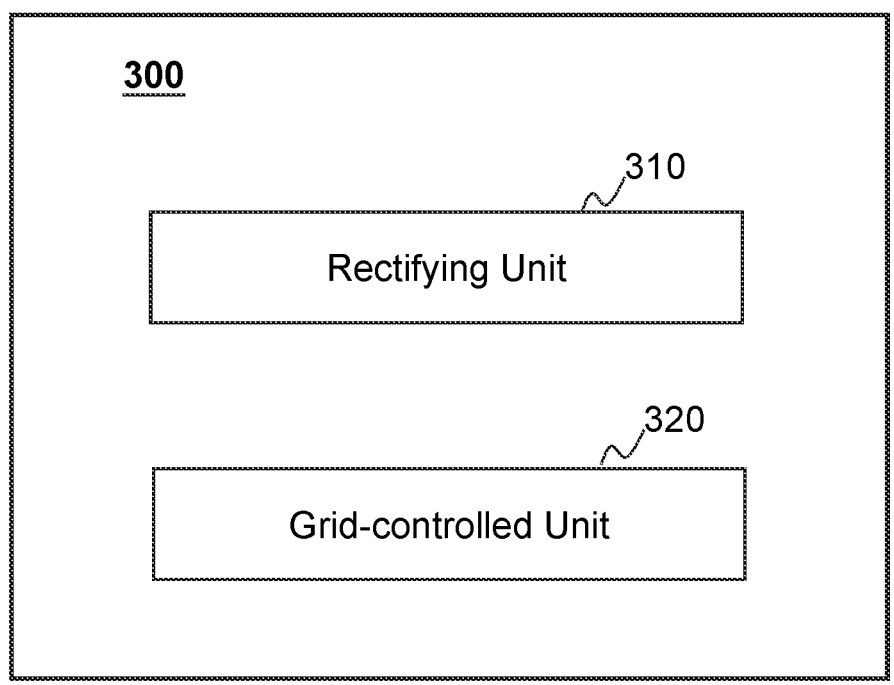
FIG. 3 is a block diagram illustrating an exemplary high-voltage generator 300 according to some embodiments of the present disclosure.

FIG. 3 is a block diagram illustrating an exemplary high-voltage generator 300 according to some embodiments of the present disclosure. The high-voltage generator 300 may be configured to generate a high voltage that exceeds a voltage threshold. The voltage threshold may be, for example, 1,000 Volt (1 kV), 2 kV, 3 kV, 5 kV, 10 kV, 20 kV, 50 kV, etc. The high voltage may be applied in medical imaging, radiation therapy, power transmission, etc. For illustration purposes, the high-voltage generator 300 may be disposed in a medical imaging system. Exemplary medical imaging systems may include a computed tomography (CT) system, a digital radiography (DR) system, a C-arm X-ray system, a computed tomography-positron emission tomography (CT-PET) system, or the like, or a combination thereof. It should be noted that this not intended to be limiting, and the high-voltage generator may be applied to other devices, such as a radiation therapy device (e.g., an intensity-modulated radiation therapy (IMRT) device, an intensity-modulated arc therapy (IMAT) device, etc.).

In some embodiments, a radiation source of a radiation device (e.g., an X-ray imaging device, an X-ray treatment device) in a medical imaging system may include the high-voltage generator 300, a radiation tube, or any other components (e.g., a collimator). The high-voltage generator 300 may be configured to provide a tube voltage to the radiation tube. The tube voltage may switch between a high voltage and a low voltage.

As shown in FIG. 3, the high-voltage generator 300 may include a rectifying unit 310 and a grid-controlled unit 320. The rectifying unit 310 may be configured to rectify an electric current generated in the high-voltage generator 300. For example, the rectifier unit 310 may transform the electric current from an alternative current to a direct current. Exemplary rectifier units may include a diode rectifier, a silicon controlled rectifier, a thyristor rectifier, a bridge rectifier, or the like, or any combination thereof. For instance, the rectifying unit 310 may be a diode rectifier including an array of diodes. The diodes in the array of diodes may be connected in series or in parallel. The grid-controlled unit 320 may be configured to generate the high voltage and electrically connected to the rectifying unit 310.

The high-voltage generator 300 may further include one or more units of other types (not shown in the figure). In some embodiments, the high-voltage generator 300 may include an inversion unit. The inversion unit may be configured to convert a direct current into an alternative current. Exemplary inversion units may include a mono-phase half-bridge inverter, a mono-phase whole-bridge inverter, a push-pull inverter, a three-phase bridge inverter, or the like, or any combination thereof.

In some embodiments, the high-voltage generator 300 may include a suppressing unit. The suppressing unit may be configured to suppress an amplitude of the electric current. For example, the suppressing unit may be configured to suppress a surge current by reducing an amplitude of the surge current so as to avoid the surge current flowing to a radiation source (e.g., a radiation tube) connected to the high-voltage generator 300 when an ignition fault of the high-voltage generator 300 occurs. In some embodiments, the suppressing unit may include one or more diodes, one or more resistors, and/or one or more inductors. The suppressing unit may be electrically connected between the rectifying unit 310 and the grid-controlled unit 320. The rectifying unit 310, the suppressing unit, and the grid-controlled unit 320 may be connected in series.

In some embodiments, the grid-controlled unit 320 may include a grid-controlled power source. The grid-controlled power source may include a conductive housing (e.g., a metal housing) for accommodating electrical elements of the grid-controlled power source. The conductive housing may have a conductive surface that opposes the rectifying unit 310. In some embodiments, an electric potential of the conductive surface of the grid-controlled unit 320 may have a same polarity as an electric potential of the rectifying unit 310. For example, both the conductive surface of the grid-controlled unit 320 and the rectifying unit 310 may have a positive electric potential. Alternatively, the electric potential of the conductive surface of the grid-controlled unit 320 may have an opposite polarity to the electric potential of the rectifying unit 310. For example, the conductive surface of the grid-controlled unit 320 may have a positive electric potential, and the rectifying unit 310 may have a negative electric potential. In some embodiments, the conductive surface may be substantially parallel to a first plane where the rectifying unit 310 is disposed. Stray capacitance may exist between the conductive surface of the grid-controlled unit 320 and the rectifying unit 310. The grid-controlled unit 320 may be electrically connected to the suppressing unit. In some embodiments, an electric potential of the grid-controlled unit 320 may be equal to an electric potential of an end of the suppressing unit connected to grid-controlled unit 320. For example, the grid-controlled unit 320 may be electrically connected to a cathode of suppressing unit, which may have a negative high electric potential. In some embodiments, an electric potential of the conductive housing of the grid-controlled unit 320 may be the negative high electric potential.

In some cases, for example, upon the occurrence of an ignition fault, an electric potential difference between the conductive surface of the grid-controlled unit 320 and the rectifying unit 310 is relatively high, and the electric potential of the conductive housing of the grid-controlled unit 320 may have a saltation (e.g., at a rate of 70 kV/10 ns). In the meanwhile, an electric potential of the rectifying unit 310 may remain substantially unchanged, thus causing a large amount of electrical charges to flow to the rectifying unit 310 (e.g., the array of diodes), thereby damaging the array of diodes of the rectifying unit 310.

In some embodiments, the high-voltage generator 300 may be configured such that a projection area of the rectifying unit 310 onto the conductive surface of the grid-controlled unit 320 along a specific projection direction may be smaller than an original projection area of the rectifying unit 310, thereby reducing the stray capacitance between rectifying unit 310 and the conductive surface of the grid-controlled unit 320. The specific projection direction may be a direction substantially perpendicular to a plane where the conductive surface of the grid-controlled unit 320 is disposed. The larger the projection area of the rectifying unit 310 onto the conductive surface of the grid-controlled unit 320 along the specific projection direction is, the greater the stray capacitance may be.

In some embodiments, the high-voltage generator 300 may include a shielding device located between the rectifying unit 310 and the grid-controlled unit 320. A projection of the shielding device along a first direction may cover at least a portion of the rectifying unit 310, which may reduce the stray capacitance between the conductive surface of the grid-controlled unit 320 and the rectifying unit 310, and further reduce the impact of the saltation of the electric potential of the conductive housing of the grid-controlled unit 320 on the rectifying unit 310, thereby facilitating a normal and stable operation of the high-voltage generator 300.

In some other embodiments, the rectifying unit 310 may be substantially disposed in a first plane. The conductive surface of the grid-controlled unit 320 may be arranged facing the rectifying unit 310. An angle between the first plane and the conductive surface may be configured in a range larger than 0 degrees and smaller than 180 degrees, which may also reduce the stray capacitance between the conductive surface of the grid-controlled unit 320 and the rectifying unit 310, thereby facilitating the normal and stable operation of the high-voltage generator 300.

More descriptions regarding the high-voltage generator 300 may be found elsewhere in the present disclosure. See, e.g., FIGS. 4-7 and the descriptions thereof.

FIGS. 4A-4D are schematic diagrams illustrating an exemplary high-voltage generator 400 according to some embodiments of the present disclosure. In some embodiments, the high-voltage generator 400 may be an example of the electrical apparatus 100 as described in FIG. 1 or the high-voltage generator 300 as described in FIG. 3. As shown in FIGS. 4A-4D, the high-voltage generator 400 may include a rectifying unit 410, a shielding device 420, and a grid-controlled unit 430.

Figure 4A:
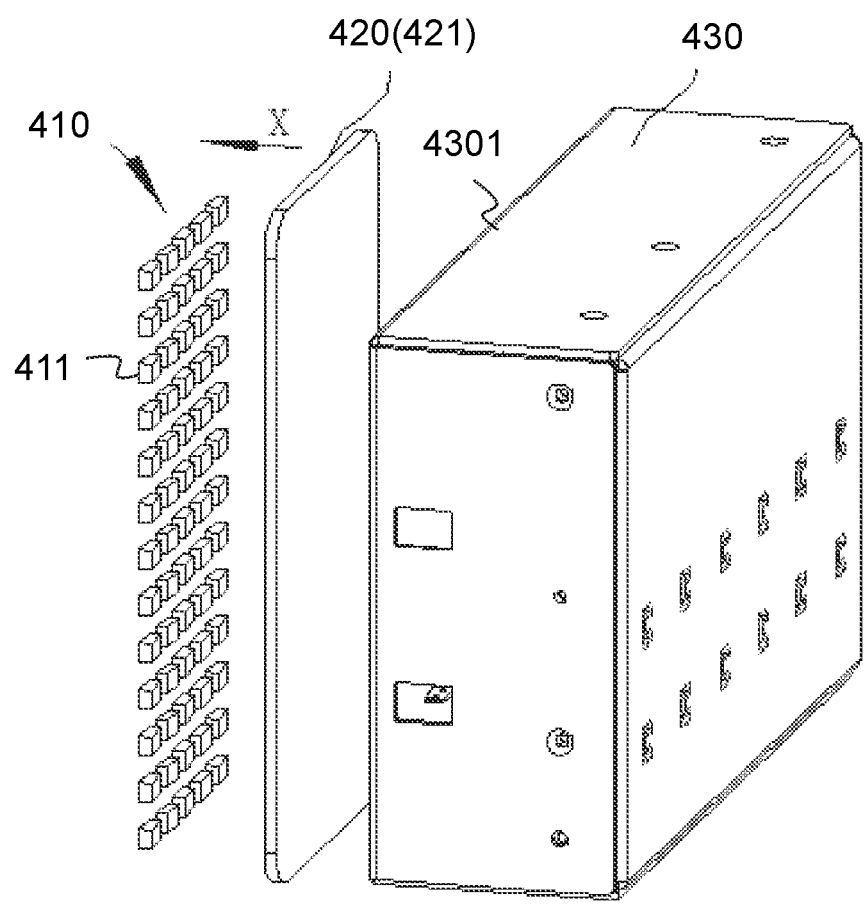
FIGS. 4A-4D are schematics illustrating an exemplary high-voltage generator 400 according to some embodiments of the present disclosure.
Figure 4B:
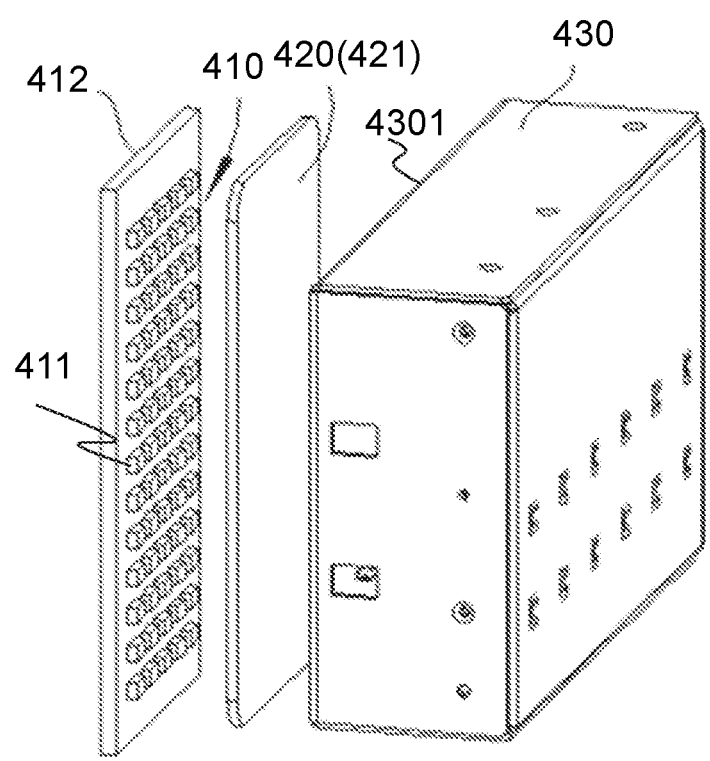
Figure 4C:
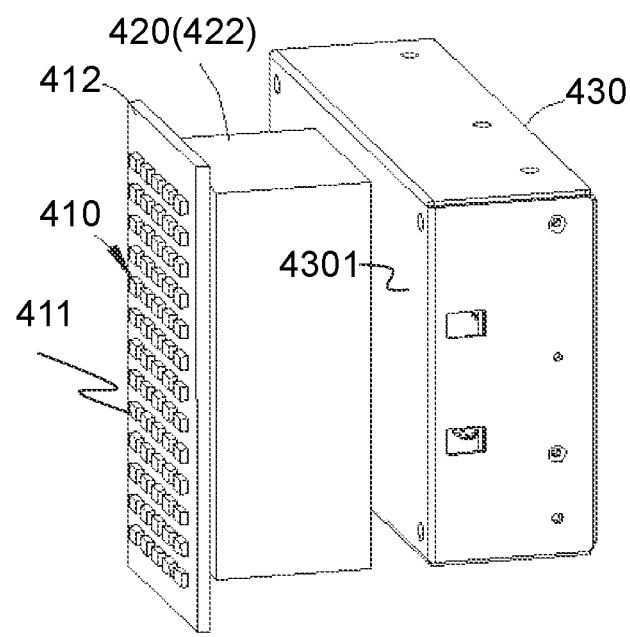
Figure 4D:
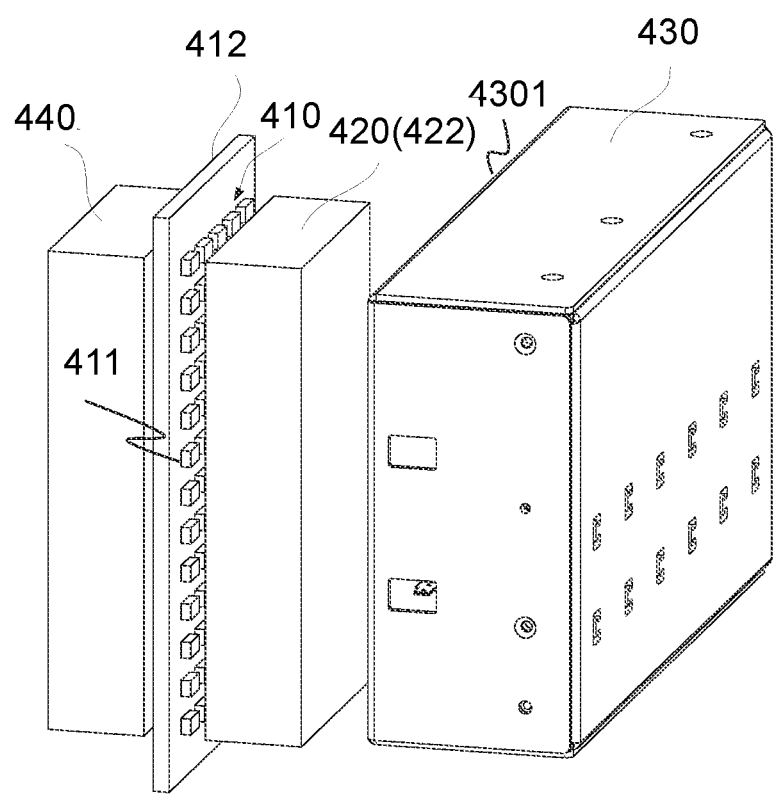

The rectifying unit 410 may be configured to rectify an electric current generated in the high-voltage generator 400. In some embodiments, as shown in FIGS. 4A-4D, the rectifying unit 410 may include an array of diodes 411. The diodes in the array of diodes 411 may be connected in series or in parallel. In some embodiments, as shown in FIGS. 4B-4D, the rectifying unit 410 may further include a rectifying plate 412. The rectifying unit 410 may be disposed on the rectifying plate 412. For example, the array of diodes 411 may be disposed on the rectifying plate 412. A first plane in which the rectifying unit 410 is disposed may be determined with reference to the rectifying plate 412.

The grid-controlled unit 430 may be configured to generate a high voltage (e.g., 1 kV, 2 kV, 5 kV, 10 kV, 50 kV, etc.). The grid-controlled unit 430 may be electrically connected to the rectifying unit 410, for example, through a suppressing unit (not shown in the figure). The grid-controlled unit 430 may include a grid-controlled power source. The grid-controlled power source may include a conductive housing (e.g., a metal housing) for accommodating electrical elements of the grid-controlled power source. The conductive housing of the grid-controlled unit 430 may have a conductive surface 4301 that opposes the rectifying unit 410. In some embodiments, an electric potential of the conductive surface 4301 of the grid-controlled unit 430 may have a same polarity as an electric potential of the rectifying unit 410. For example, both the conductive surface 4301 of the grid-controlled unit 430 and the rectifying unit 410 may have a positive electric potential. Alternatively, the electric potential of the conductive surface 4301 of the grid-controlled unit 430 may have an opposite polarity to the electric potential of the rectifying unit 410. For example, the conductive surface 4301 of the grid-controlled unit 430 may have a positive electric potential, and the rectifying unit 410 may have a negative electric potential. In some embodiments, as shown in FIGS. 4A-4D, a plane where the rectifying unit 410 is disposed may be parallel to a plane where the conductive surface 4301 is disposed. A first stray capacitance may exist between the rectifying unit 410 and the conductive surface 4301 of the conductive housing of the grid-controlled unit 430.

The shielding device 420 may be a conductive device. In some embodiments, the shielding device 420 may be or include at least one conductor. The at least one conductor may be, for example, a conductive plate, a conductive bar, a resistor, a capacitor, etc. For example, the shielding device 420 may include a metal plate facing the rectifying unit 410. As another example, the shielding device 420 may include one or more electric components of the high-voltage generator 400 facing the rectifying unit 410. The one or more electric components may be conductive components.

The shielding device 420 may be located between the rectifying unit 410 and the conductive surface 4301 of the grid-controlled unit 430. The shielding device 420 may be spaced apart from the rectifying unit 410 and the conductive surface 4301 of the grid-controlled unit 430. For example, a distance between the rectifying unit 410 and the shielding device 420 (e.g., between a center or a specific point of the rectifying unit 410 and a center or a specific point of the shielding device 420 may exceed a fourth threshold distance. The fourth threshold distance may be, for example, 1 millimeter, 1.5 millimeter, 2 millimeters, 1 centimeter, 2 centimeters, 3 centimeters, 5 centimeters, etc. A distance between the shielding device 420 and the conductive surface 4301 of the grid-controlled unit 430 (e.g., between a center or a specific point of the shielding device 420 and a center or a specific point of the conductive surface 4301 of the grid-controlled unit 430 may exceed a fifth threshold distance. The fifth threshold distance may be, for example, 1 millimeter, 3 millimeter, 5 millimeters, 1 centimeter, 3 centimeters, 5 centimeters, etc. In some embodiments, the shielding device 420 may be electrically connected to the rectifying unit 410.

The first stray capacitance between the conductive surface 4301 and the rectifying unit 410 may relate to a distance between the rectifying unit 410 and the conductive surface 4301, a projection area (also referred to as projection region) of the rectifying unit 410 onto the conductive surface 4301 along a specific projection direction, etc. The smaller the distance is, the greater the first stray capacitance may be. The larger the projection area, the greater the first stray capacitance may be. The projection area of rectifying unit 410 refers to an actual area of the projection of the rectifying unit 410 onto the conductive surface 4301 along the specific projection direction after the shielding device 420 may be arranged between the rectifying unit 410 and the conductive surface 4301. The specific projection direction may be a direction substantially perpendicular to a plane where the conductive surface 4301 is disposed.

In some embodiments, the shielding device 420 may include a conductive structure. Merely by way of example, as shown in FIG. 4A and 4B, the shielding device 420 may include a shielding plate 421 facing the rectifying unit 410. The shielding plate 421 may include a metal plate or a conductive composite plate (e.g., an electroconductive plastics plate, an electroconductive rubber plat, etc.). The shielding plate 421 may be located between the rectifying unit 410 and the conductive surface 4301 of the grid-controlled unit 430.

In some embodiments, a projection of the shielding plate 421 along a first direction may cover at least a portion of the rectifying unit 410. The projection of the shielding plate 421 along the first direction may form a projection area on the rectifying unit 410. An area of the projection area may be at least a portion of an area of the rectifying unit 410. For example, the area of the projection area may be one third of the area of the rectifying unit 410, which may indicate that the projection of the shielding plate 421 along the first direction covers one third of the rectifying unit 410. As another example, the area of the projection area may be a half of the area of the rectifying unit 410, which may indicate that the projection of the shielding plate 421 along the first direction covers a half of the rectifying unit 410. As a further example, the area of the projection area may equal the area of the rectifying unit 410, which may indicate that the projection of the shielding plate 421 along the first direction covers the entire rectifying unit 410. The first direction refers to the opposite direction of the projection direction of the rectifying unit 410 onto the conductive surface 4301. The first direction may be, e.g., the X direction shown in FIG. 4A. In this way, the projection area of the rectifying unit 410 onto the conductive surface 4301 may be reduced, which may reduce the first stray capacitance between the conductive surface 4301 of the grid-controlled unit 430 and the rectifying unit 410, and further reduce the impact of the saltation of the electric potential of the conductive housing of the grid-controlled unit 430 on the rectifying unit 410, thereby facilitating a normal and stable operation of the high-voltage generator 400.

In the case that the projection of the shielding plate 421 along the first direction may cover the entire rectifying unit 410, the area of the projection of the shielding plate 421 on the rectifying unit 410 may be larger than or equal to the area of the rectifying unit 410, so that the projection area of the rectifying unit 410 onto the conductive surface 4301 may be reduced (e.g., to zero).

In some embodiments, the shielding plate 421 may have a specific electric potential. The specific electric potential may be determined by a user (e.g., a technician), according to an actual need, etc. For example, the specific electric potential of the shielding plate 421 may be 0-17.5 kV. As another example, the shielding plate 421 may be grounded, and the specific electric potential of the shielding plate 421 may have a ground potential (e.g., 0). A second stray capacitance may exist between the rectifying unit 410 and shielding plate 421. In some embodiments, the shielding plate 421 may be electrically connected to the rectifying unit 410. The electrical charges existing in the high-voltage generator 400 (e.g., the conductive surface 4301) due to the first stray capacitance may flow to the ground, thereby preventing the array of diodes of the rectifying unit 410 from being damaged. In some embodiments, the rectifying unit 410 may also be grounded.

In some embodiments, the high-voltage generator 400 may include a rectifying module. The rectifying module may include the rectifying unit 410 including the array of diodes 411 and the rectifying plate 412, and one or more voltage-multiplying capacitors. The one or more voltage-multiplying capacitors and the array of diodes 411 may provide a voltage-multiplying electrical circuit which may convert alternating current to direct current and make the value of the resulting D.C. voltage a variable multiple of the value of the A.C. voltage. Each of the one or more voltage-multiplying capacitors may be or include one or more capacitors (e.g., ceramic capacitors, film capacitors, etc.). Each of the one or more voltage-multiplying capacitors may have a specific shape, such as a cylinder, a plate, a cuboid, etc. Merely by way of example, each of the one or more voltage-multiplying capacitors may have a shape of a cylinder. In some embodiments, the one or more voltage-multiplying capacitors may be electrically connected to the rectifying unit 410 (e.g., the array of diodes 411).

In some embodiments, the shielding device 420 may include at least one conductive component of the high-voltage generator 400. For instance, at least one of the one or more voltage-multiplying capacitors may be implemented as the shielding device 420. For example, as shown in FIG. 4C and 4D, the shielding device 420 may include a first voltage-multiplying capacitor 422. The first voltage-multiplying capacitor 422 may be located between the rectifying unit 410 and the conductive surface 4301 of the grid-controlled unit 430. Similar to the shielding plate 421, a projection of the voltage-multiplying capacitor 422 along the first direction may cover at least a portion of the rectifying unit 410, so that the projection area of the rectifying unit 410 onto the conductive surface 4301 may be reduced, and the descriptions of which are not repeated here.

Merely for illustration, the first voltage-multiplying capacitor 422 may have a shape of a cylinder. The first voltage-multiplying capacitor 422 may be wrapped in an electrically insulating (also referred to as insulating for brevity) material (e.g., a resin, a plastic, etc.). The first voltage-multiplying capacitor 422 wrapped in the insulating material may have another shape, for example, a cuboid. It should be noted that the projection area of the voltage-multiplying capacitor 422 on the rectifying unit 410 may be the area of the projection of the cylinder, rather than the cuboid.

In some embodiments, the one or more voltage-multiplying capacitors may further include a second voltage-multiplying capacitor (e.g., a second voltage-multiplying capacitor 440 shown in FIG. 4D). The second voltage-multiplying capacitor may be disposed at any suitable positions. For example, the second voltage-multiplying capacitor may be disposed at one side of the rectifying unit 410 away from the grid-controlled unit 430.

Conventionally, stray capacitance between a grid-controlled unit and a rectifying unit in a high-voltage generator may be reduced by measures including, e.g., setting the grid-controlled unit farther apart from the rectifying unit (that is by increasing a distance between the grid-controlled unit and the rectifying unit), or disposing the grid-controlled unit and the rectifying unit in different containers, respectively. Such measures may increase a volume of the high-voltage generator.

According to some embodiments of the present disclosure, the first stray capacitance between the grid-controlled unit and the rectifying unit may be reduced by arranging the shielding device between the rectifying unit and the grid-controlled unit, which may reduce or avoid the impact of the saltation of the electric potential of the conductive housing of the grid-controlled unit on the rectifying unit, thereby facilitating a normal and stable operation of the high-voltage generator. In some embodiments, the shielding device may be implemented as the shielding plate. Alternatively, the shielding device may also be a conductive component of the high-voltage generator. In this case, the addition of the shielding device in the high-voltage generator may cause no or little increase in the volume of the high-voltage generator, thereby saving costs of the high-voltage generator and maintaining the compactness of the high-voltage generator.

Figure 5:
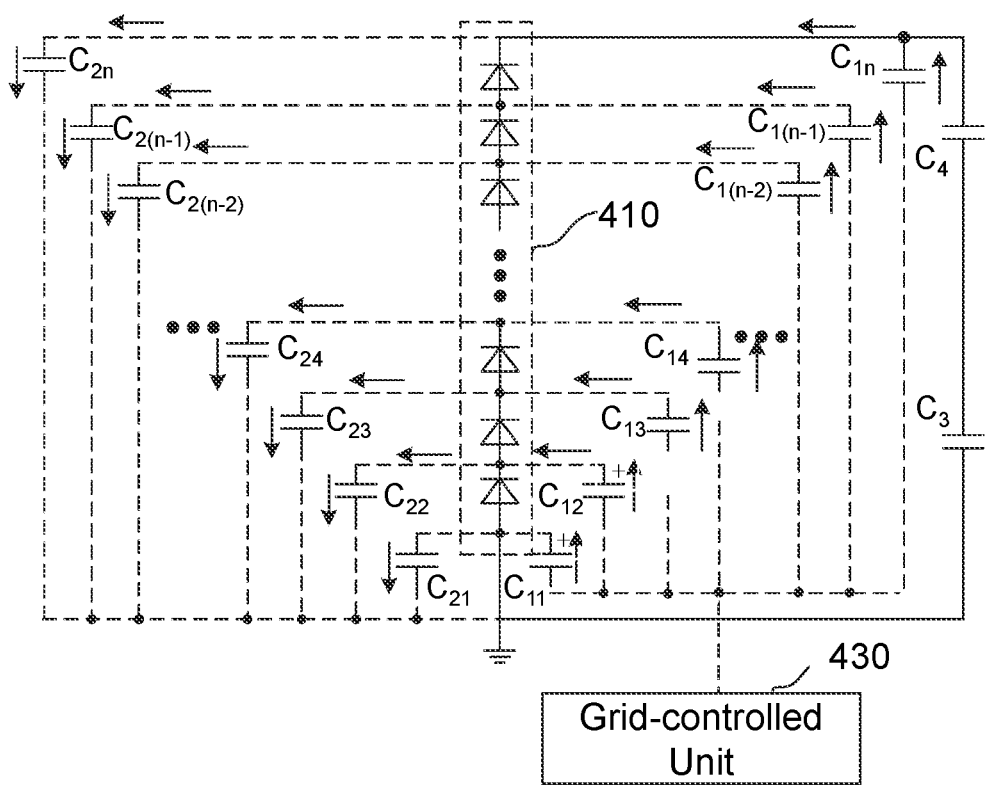
FIG. 5 is a schematic illustrating an exemplary equivalent electrical circuit 500 in the high-voltage generator 400 in FIG. 4A or FIG. 4B according to some embodiments of the present disclosure.

FIG. 5 is a schematic diagram illustrating an exemplary equivalent electrical circuit 500 of the high-voltage generator 400 in FIG. 4A or FIG. 4B according to some embodiments of the present disclosure.

As shown in FIG. 5, the equivalent electrical circuit 500 may include the array of diodes 411 in the rectifying unit 410, the grid-controlled unit 430, two voltage-multiplying capacitors $C_3$ and $C_4$, the shielding device 420 (not shown), and a suppressing unit (not shown). The shielding device 420 may be the shielding plate 421 located between the array of diodes 411 and the grid-controlled unit 430. The shielding plate 421 and the array of diodes 411 may be grounded. The grid-controlled unit 430 is electrically connected to a cathode of the suppressing unit, which may have a negative high electric potential. In some embodiments, an electric potential of a conductive housing of the grid-controlled unit 430 may be the negative high electric potential. The electric potentials of the voltage-multiplying capacitor $C_3$, the voltage-multiplying capacitor $C_4$, and the conductive housing of the grid-controlled unit 430 may be determined by a user (e.g., an engineer), according to default settings of the electrical apparatus 100, etc. For example, the electric potentials of the voltage-multiplying capacitor $C_3$, the voltage-multiplying capacitor $C_4$, and the conductive housing of the grid-controlled unit 430 may be 0-17.5 kv, 17.5-35 kv, -70 kv, respectively.

As shown in FIG. 5, a first stray capacitance $C_1$ may exist between a conductive surface of the conductive housing of the grid-controlled unit 430 and the array of diodes 411. The first stray capacitance may include first sub-stray capacitances $C_{11}, C_{12}, C_{13}, C_{14}, \ldots, C_{1(n-2)}, C_{1(n-1)}, C_{1n}$. A second stray capacitance may exist between the array of diodes 411 and shielding plate 421. The second stray capacitance $C_2$ may include second sub-stray capacitances $C_{21}, C_{22}, C_{23}, C_{24}, \ldots, C_{2(n-2)}, C_{2(n-1)}, C_{2n}$. Each of the array of diodes 411 may correspond to one of the first sub-stray capacitances $C_{11}, C_{12}, C_{13}, C_{14}, \ldots, C_{1(n-2)}, C_{1(n-1)}, C_{1n}$ and one of the second sub-stray capacitances $C_{21}, C_{22}, C_{23}, C_{24}, \ldots, C_{2(n-2)}, C_{2(n-1)}, C_{2n}$.

In some cases, for example, upon the occurrence of an ignition fault, the electric potential of the conductive housing of the grid-controlled unit 430 may have a saltation (e.g., at a rate of 70 kV/10 ns). In the meanwhile, an electric potential of the rectifying unit 410 may substantially remain unchanged, thus causing the first stray capacitance between the conductive surface of the grid-controlled unit 430 and the rectifying unit 410. A large amount of electrical charges may exist due to the first stray capacitance. The large amount of electrical charges may flow to the ground, thereby preventing the array of diodes of the rectifying unit 410 from being damaged.

Figure 6:
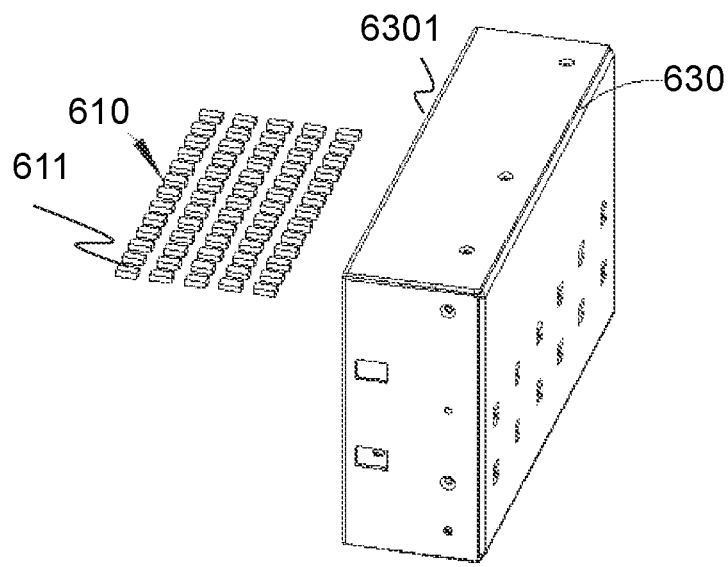
FIG. 6 is a schematic illustrating an exemplary high-voltage generator 600 according to some embodiments of the present disclosure.

FIG. 6 is a schematic diagram illustrating an exemplary high-voltage generator 600 according to some embodiments of the present disclosure. In some embodiments, the exemplary high-voltage generator 600 may be an example of the electrical apparatus 100 described in FIG. 1 or the high-voltage generator 300 described in FIG. 3. As shown in FIG. 6, the high-voltage generator 600 may include a rectifying unit 610, and a grid-controlled unit 630, etc.

The rectifying unit 610 may be configured to rectify an electric current generated in the high-voltage generator 600. In some embodiments, as shown in FIG. 6, the rectifying unit 610 may include an array of diodes 611. The diodes in the array of diodes 611 may be connected in series or in parallel. In some embodiments, the rectifying unit 610 may further include a rectifying plate. The rectifying unit 610 may be disposed on the rectifying plate. For example, the array of diodes 611 may be disposed on the rectifying plate. A first plane in which the rectifying unit 610 is disposed may be determined with reference to the rectifying plate.

The grid-controlled unit 630 may be configured to generate a high voltage (e.g., 1 kV, 2 kV, 5 kV, 10 kV, 50 kV, etc.). The grid-controlled unit 630 may be electrically connected to the rectifying unit 610, for example, through a suppressing unit (not shown in the figure). The grid-controlled unit 630 may include a grid-controlled power source. The grid-controlled power source may include a conductive housing (e.g., a metal housing) for accommodating electrical elements of the grid-controlled power source. The conductive housing of the grid-controlled unit 630 may have a conductive surface 6301 that opposes the rectifying unit 610. In some embodiments, an electric potential of the conductive surface 6301 of the grid-controlled unit 630 may have a same polarity as an electric potential of the rectifying unit 610. For example, both the conductive surface 6301 of the grid-controlled unit 630 and the rectifying unit 610 may have a positive electric potential. Alternatively, the electric potential of the conductive surface 6301 of the grid-controlled unit 630 may have an opposite polarity to the electric potential of the rectifying unit 610. For example, the conductive surface 6301 of the grid-controlled unit 630 may have a positive electric potential, and the rectifying unit 610 may have a negative electric potential. In some embodiments, as shown in FIG. 6, a plane where the rectifying unit 610 is disposed may be parallel to a plane where the conductive surface 6301 is disposed. A first stray capacitance may exist between the rectifying unit 610 and the conductive surface 6301 of the conductive housing of the grid-controlled unit 630.

The first stray capacitance may relate to a distance between the rectifying unit 610 and the conductive surface 6301, a projection area (also referred to as projection region) of the rectifying unit 610 onto the conductive surface 6301 along a specific projection direction, etc. The smaller the distance is, the greater the first stray capacitance may be. The larger the projection area, the greater the first stray capacitance may be.

In some embodiments, the rectifying unit 610 may be substantially disposed in a first plane. An angle between the first plane and a plane where the conductive surface 6301 is located may be larger than 0 degrees and smaller than 180 degrees, which may reduce the projection area of the rectifying unit 610 onto the conductive surface 6301 along the specific projection direction, and further reduce the first stray capacitance between the rectifying unit 610 onto the conductive surface 6301, thereby facilitating the normal and stable operation of the high-voltage generator 600.

In some embodiments, the angle may be larger than 20 degrees and smaller than 160 degrees. In some embodiments, the angle may be larger than 30 degrees and smaller than 150 degrees. In some embodiments, the angle may be larger than 45 degrees and smaller than 135 degrees. In some embodiments, the angle may be larger than 60 degrees and smaller than 120 degrees. In some embodiments, the angle may be larger than 75 degrees and smaller than 105 degrees. In some embodiments, the angle may equal 90 degrees, so that the projection area of the rectifying unit 610 onto the conductive surface 6301 may be reduced to a minimum area.

Figure 7:
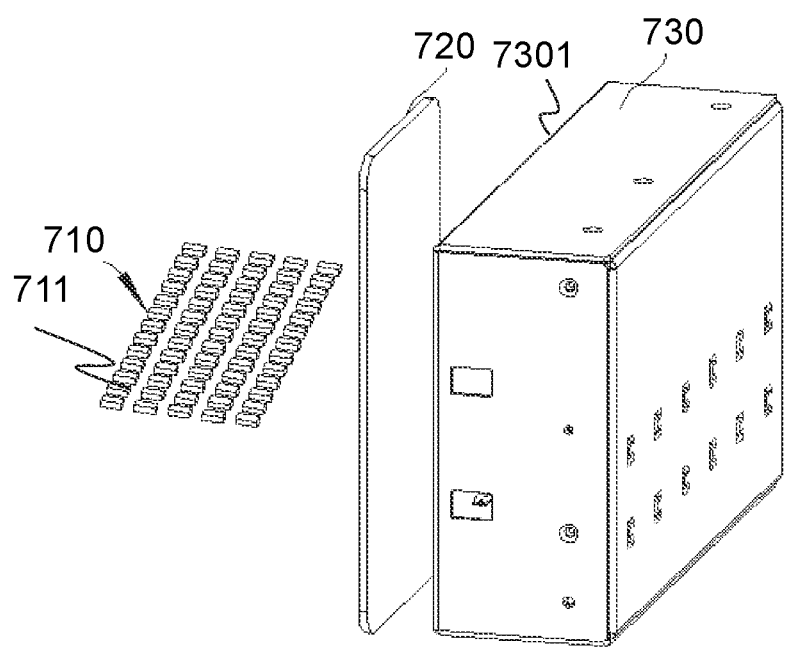
FIG. 7 is a schematic illustrating an exemplary high-voltage generator 700 according to some embodiments of the present disclosure.

FIG. 7 is a schematic illustrating an exemplary high-voltage generator 700 according to some embodiments of the present disclosure. In some embodiments, the exemplary high-voltage generator 700 may be an exemplary embodiment of the electrical apparatus 100 described in FIG. 1 or an exemplary embodiment of the high-voltage generator 300 described in FIG. 3.

As shown in FIG. 7, the high-voltage generator 700 may include a rectifying unit 710, a shielding device 720, and a grid-controlled unit 730, a suppressing unit (not shown), an inversion unit (not shown), etc.

The inversion unit may be configured to convert a direct current into an alternative current. The suppressing unit may be configured to suppress an amplitude of the electric current from the rectifying unit to a load device and be electrically connected between the rectifying unit 710 and the grid-controlled unit 730. More descriptions for the inversion unit and the suppressing unit may be found elsewhere in the present disclosure. See, e.g., FIG. 3 and the descriptions thereof.

The rectifying unit 710 may be configured to rectify an electric current generated in the high-voltage generator 700. In some embodiments, as shown in FIG. 7, the rectifying unit 710 may include an array of diodes 711. The diodes in the array of diodes 711 may be connected in series or in parallel. In some embodiments, the rectifying unit 710 may further include a rectifying plate. The rectifying unit 710 may be disposed on the rectifying plate. For example, the array of diodes 711 may be disposed on the rectifying plate. A first plane in which the rectifying unit 710 is disposed may be determined with reference to the rectifying plate. More descriptions for the rectifying unit 710 may be found elsewhere in the present disclosure. See, e.g., FIG. 3 and the descriptions thereof.

The grid-controlled unit 730 may be configured to generate a high voltage (e.g., 1 kV, 2 kV, 5 kV, 10 kV, 50 kV, etc.). The grid-controlled unit 730 may be electrically connected to the rectifying unit 710, for example, through a suppressing unit (not shown in the figure). The grid-controlled unit 730 may include a grid-controlled power source. The grid-controlled power source may include a conductive housing (e.g., a metal housing) for accommodating electrical elements of the grid-controlled power source. The conductive housing of the grid-controlled unit 730 may have a conductive surface 7301 that opposes the rectifying unit 710. A first stray capacitance may exist between the rectifying unit 710 and the conductive surface 7301 of the conductive housing of the grid-controlled unit 730. More descriptions for the grid-controlled unit may be found elsewhere in the present disclosure. See, e.g., FIG. 3 and the descriptions thereof.

The shielding device 720 may be a conductive device. In some embodiments, the shielding device 720 may be or include at least one conductor. The at least one conductor may be, for example, a conductive plate, a conductive bar, a resistor, a capacitor, etc. For example, the shielding device 720 may include a metal plate facing the rectifying unit 710. As another example, the shielding device 720 may include one or more electric components of the high-voltage generator 700 facing the rectifying unit 710. The one or more electric components may be conductive components.

The shielding device 720 may be located between the rectifying unit 710 and the conductive surface 7301 of the grid-controlled unit 730. The shielding device 720 may be spaced apart from the rectifying unit 710 and the conductive surface 7301 of the grid-controlled unit 730. In some embodiments, the shielding device 720 may be electrically connected to the rectifying unit 410.

The first stray capacitance between the conductive surface 7301 and the rectifying unit 710 may relate to a distance between the rectifying unit 710 and the conductive surface 7301, a projection area (also referred to as projection region) of the rectifying unit 710 onto the conductive surface 7301 along a specific projection direction, etc. The smaller the distance is, the greater the first stray capacitance may be. The larger the projection area, the greater the first stray capacitance may be. The projection area of rectifying unit 710 refers to an actual area of the projection of the rectifying unit 710 onto the conductive surface 7301 along the specific projection direction after the shielding device 720 may be arranged between the rectifying unit 710 and the conductive surface 7301. The specific projection direction may be a direction substantially perpendicular to a plane where the conductive surface 7301 is disposed.

In some embodiments, a projection of the shielding device 720 along a first direction may cover at least a portion of the rectifying unit 710. In some embodiments, the shielding device 720 may be the same as or similar to the shielding device 420 described in FIGS. 4A-4D, the descriptions of which are not repeated here.

In some embodiments, at least a portion of the rectifying unit 710 may be substantially disposed in a first plane. An angle between the first plane and a plane where the conductive surface 7301 is located may be larger than 0 degrees and smaller than 180 degrees, which may reduce the projection area of the rectifying unit 710 onto the conductive surface 7301 along the specific projection direction, and further reduce the first stray capacitance between the rectifying unit 710 onto the conductive surface 7301, thereby facilitating the normal and stable operation of the high-voltage generator 700.

In some embodiments, the angle may be larger than 20 degrees and smaller than 160 degrees. In some embodiments, the angle may be larger than 30 degrees and smaller than 150 degrees. In some embodiments, the angle may be larger than 45 degrees and smaller than 135 degrees. In some embodiments, the angle may be larger than 60 degrees and smaller than 120 degrees. In some embodiments, the angle may be larger than 75 degrees and smaller than 105 degrees. In some embodiments, the angle may equal 90 degrees, so that the projection area of the rectifying unit 610 onto the conductive surface 6301 may be reduced to a minimum area.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer-readable media having computer-readable program code embodied thereon.

A non-transitory computer-readable signal medium may include a propagated data signal with computer readable program code embodied therein, for example, in baseband or as part of a carrier wave. Such a propagated signal may take any of a variety of forms, including electromagnetic, optical, or the like, or any suitable combination thereof. A computer-readable signal medium may be any computer-readable medium that is not a computer-readable storage medium and that may communicate, propagate, or transport a program for use by or in connection with an instruction execution system, apparatus, or device. Program code embodied on a computer-readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object-oriented programming language such as Java, Scala, Smalltalk, Eiffel, JADE, Emerald, C++, C#, VB.NET, Python or the like, conventional procedural programming languages, such as the "C" programming language, Visual Basic, Fortran, Perl, COBOL, PHP, ABAP, dynamic programming languages such as Python, Ruby, and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution, e.g., an installation on an existing server or mobile device.

Similarly, it should be appreciated that in the foregoing description of embodiments of the present disclosure, various features are sometimes grouped together in a single embodiment, figure, or description thereof to streamline the disclosure aiding in the understanding of one or more of the various inventive embodiments. This method of disclosure, however, is not to be interpreted as reflecting an intention that the claimed object matter requires more features than are expressly recited in each claim. Rather, inventive embodiments lie in less than all features of a single foregoing disclosed embodiment.

In some embodiments, the numbers expressing quantities, properties, and so forth, used to describe and claim certain embodiments of the application are to be understood as being modified in some instances by the term "about," "approximate," or "substantially." For example, "about," "approximate" or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A high-voltage generator, comprising:
   a rectifying unit configured to rectify an electric current generated in the high-voltage generator;
   a grid-controlled unit configured to generate a high voltage and electrically connected to the rectifying unit, the grid-controlled unit having a conductive surface that opposes the rectifying unit; and
   a shielding device located between the rectifying unit and the conductive surface of the grid-controlled unit, the shielding device being spaced apart from the rectifying unit and the conductive surface of the grid-controlled unit, and the shielding device being electrically connected to the rectifying unit.

2. The high-voltage generator of claim 1, wherein a projection of the shielding device along a first direction covers at least a portion of the rectifying unit.

3. The high-voltage generator of claim 1, wherein the rectifying unit includes an array of diodes.

4. The high-voltage generator of claim 1, wherein stray capacitance exists between the conductive surface of the grid-controlled unit and the rectifying unit.

5. The high-voltage generator of claim 1, wherein the shielding device includes:
a shielding plate facing the rectifying unit, a projection of the shielding plate along a first direction covering at least a portion of the rectifying unit.

6. The high-voltage generator of claim 5, wherein the shielding plate includes a metal plate.

7. The high-voltage generator of claim 1, wherein the shielding device includes:
at least one voltage-multiplying capacitor, a projection of the at least one voltage-multiplying capacitor along the first direction covering at least a portion of the rectifying unit.

8. The high-voltage generator of claim 1, further including:
a rectifying plate, the rectifying unit being disposed on the rectifying plate.

9. The high-voltage generator of claim 1, further including:
a suppressing unit electrically connected between the rectifying unit and the grid-controlled unit, the suppressing unit being configured to suppress an amplitude of the electric current from the rectifying unit to a load device.

10. A high-voltage generator, comprising:
a rectifying unit configured to rectify an electric current generated in the high-voltage generator, the rectifying unit being substantially disposed in a first plane; and
a grid-controlled unit configured to generate a high voltage and electrically connected to the rectifying unit, the grid-controlled unit having a conductive surface, the conductive surface being arranged facing the rectifying unit, wherein an angle between the first plane and the conductive surface is larger than 0 degrees and smaller than 180 degrees.

11. The high-voltage generator of claim 10, wherein the angle equals 90 degrees.

12. The high-voltage generator of claim 10, further including a shielding device located between the rectifying unit and the grid-controlled unit, the shielding device being spaced apart from the rectifying unit and the grid-controlled unit, the shielding device being electrically connected to the rectifying unit, and a projection of the shielding device along a first direction covers at least a portion of the rectifying unit.

13. A device, comprising:
a first conductive component; and
a second conductive component opposing the first conductive component and electrically connected to the first conductive component, the first conductive component having a higher electric potential than the second conductive component, wherein a projection area of the first conductive component onto the second conductive component is smaller than an original projection area of the first conductive component onto the second conductive component.

14. The device of claim 13, further including:
a shielding device located between the first conductive component and the second conductive component, the shielding device being spaced apart from the first conductive component and the second conductive component, the shielding device being electrically connected to the first conductive component, and a projection of the shielding device along a first direction covering at least a portion of the first conductive component so that the projection area of the first conductive component onto the second conductive component is smaller than the original projection area of the first conductive component onto the second conductive component.

15. The device of claim 14, wherein the projection of the shielding device along the first direction covers the first conductive component.

16. The device of claim 14, wherein the shielding device includes a metal plate facing the first conductive component.

17. The device of claim 13, wherein the first conductive component is located on a first plane, the second conductive component is located on a second plane, and an angle between the first plane and the second plane is larger than 0 degrees and smaller than 180 degrees so that the projection area of the first conductive component onto the second conductive component is smaller than the original projection area of the first conductive component onto the second conductive component .

18. The device of claim 17, wherein the angle equals 90 degrees.

19. The device of claim 13, wherein the first conductive component includes an array of diodes, and the second conductive component includes a grid-controlled power source.

20. The device of claim 19, further including:
a suppressing unit electrically connected between the array of diodes and the grid-controlled power source, the suppressing unit being configured to suppress an amplitude of an electric current from the array of diodes to a load device.

* * * * *